(12) United States Patent
Zhu

(10) Patent No.: US 11,997,106 B2
(45) Date of Patent: May 28, 2024

(54) COMMUNICATION METHOD, COMMUNICATIONS APPARATUS, SERVER, AND SYSTEM

(71) Applicant: Huawei Cloud Computing Technologies, Co., Ltd., Guizhou (CN)

(72) Inventor: Jintao Zhu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 496 days.

(21) Appl. No.: 17/216,415

(22) Filed: Mar. 29, 2021

(65) Prior Publication Data

US 2021/0218753 A1     Jul. 15, 2021

Related U.S. Application Data

(63) Continuation of application No. PCT/CN2019/097648, filed on Jul. 25, 2019.

(30) Foreign Application Priority Data

Sep. 28, 2018   (CN) .......................... 201811142997.9

(51) Int. Cl.
*H04L 9/40*     (2022.01)
*H04L 9/32*     (2006.01)
*H04W 4/06*     (2009.01)
*H04W 4/40*     (2018.01)
(Continued)

(52) U.S. Cl.
CPC .......... *H04L 63/123* (2013.01); *H04L 9/3268* (2013.01); *H04L 63/0823* (2013.01); *H04W 4/06* (2013.01); *H04W 4/40* (2018.02); *G07C 5/008* (2013.01); *G07C 5/0841* (2013.01)

(58) Field of Classification Search
None
See application file for complete search history.

(56) References Cited

U.S. PATENT DOCUMENTS

| | | |
|---|---|---|
| 8,327,157 B2 | 12/2012 | West |
| 2013/0156017 A1* | 6/2013 | Hori ................. G08G 1/096758 380/255 |
| 2016/0280371 A1* | 9/2016 | Canavor ............... B64C 39/024 |

(Continued)

FOREIGN PATENT DOCUMENTS

| | | |
|---|---|---|
| CN | 101521660 A | 9/2009 |
| CN | 101588239 A | 11/2009 |

(Continued)

*Primary Examiner* — Nelson S. Giddins
(74) *Attorney, Agent, or Firm* — Conley Rose, P.C.

(57) ABSTRACT

A communication method implemented by a communications apparatus that is configured with a control rule parameter, where the control rule parameter includes a signature verification rule parameter, a message aggregation rule parameter, and a reporting control rule parameter, and the method includes receiving a first message, performing signature verification processing on the first message based on the signature verification rule parameter, performing, based on the message aggregation rule parameter, message aggregation processing on the first message after performing the signature verification processing to obtain a second message, and sending the second message to a server based on the reporting control rule parameter.

21 Claims, 9 Drawing Sheets

(51) Int. Cl.
    *G07C 5/00*        (2006.01)
    *G07C 5/08*        (2006.01)

(56) References Cited

U.S. PATENT DOCUMENTS

2017/0310674 A1*  10/2017  Markham ............. H04L 9/0825
2018/0004933 A1    1/2018  Nathanson
2018/0255562 A1    9/2018  Cho et al.
2019/0379548 A1*  12/2019  Barrett .................... H04W 4/40

FOREIGN PATENT DOCUMENTS

| CN | 103051726 A | 4/2013 |
| CN | 104702418 A | 6/2015 |
| CN | 105280005 A | 1/2016 |
| CN | 105407094 A | 3/2016 |
| CN | 105959117 A | 9/2016 |
| CN | 106559732 A | 4/2017 |
| CN | 107251520 A | 10/2017 |
| CN | 107634837 A | 1/2018 |

* cited by examiner

COMMUNICATION METHOD, COMMUNICATIONS APPARATUS, SERVER, AND SYSTEM

CROSS-REFERENCE TO RELATED APPLICATIONS

This application is a continuation of International Patent Application No. PCT/CN2019/097648 filed on Jul. 25, 2019, which claims priority to Chinese Patent Application No. 201811142997.9 filed on Sep. 28, 2018. The disclosures of the aforementioned applications are hereby incorporated by reference in their entireties.

TECHNICAL FIELD

This application relates to the communications field, and in particular, to a communication method, a communications apparatus, a server, and a system.

BACKGROUND

In an existing technical solution, a periodic broadcast message or an event-triggered broadcast message of an On-Board Unit (OBU) of a connected vehicle may be aggregated by a road side unit (RSU). Then, an aggregated message is uploaded to a vehicle-to-everything (V2X) server for subsequent analysis and processing. "X" may be a vehicle, a road side device, a device carried by a pedestrian, an internet, or the like.

For security purposes, the broadcast message sent by the OBU is usually encrypted and signed. After receiving the broadcast message sent by the OBU, the RSU needs to perform signature verification twice to verify authenticity of the broadcast message. In other approaches, a speed at which the RSU performs signature verification on the broadcast message is far lower than a speed at which the OBU sends the broadcast message. Consequently, the RSU cannot perform signature verification on the broadcast message in time.

SUMMARY

Embodiments of this application provide a secure communication method, a communications apparatus, a server, and a system, to resolve a problem that an RSU cannot perform signature verification on a broadcast message in time.

According to a first aspect, a communication method is provided. The communication method is applied to a communications apparatus, the communications apparatus is configured with a control rule parameter, and the control rule parameter includes a signature verification rule parameter, a message aggregation rule parameter, and a reporting control rule parameter. The method includes receiving a first message sent by user equipment, performing signature verification processing on the first message based on the signature verification rule parameter, performing, based on the message aggregation rule parameter, message aggregation processing on a first message on which the signature verification processing is performed, and sending a second message to a server based on the reporting control rule parameter, where the second message is a message obtained after the signature verification processing and the message aggregation processing are performed on the first message.

According to the communication method, the first message is processed by using the control rule parameter. This resolves a problem that the signature verification cannot be performed on the message in time due to insufficient performance of an RSU.

With reference to the first aspect, in a first possible implementation of the first aspect, the signature verification rule parameter includes a first rule parameter or a second rule parameter, the first rule parameter is used to indicate to perform the signature verification processing on the first message, and the second rule parameter is used to indicate not to perform the signature verification processing on the first message.

With reference to the first aspect of the first possible implementation of the first aspect, in a second possible implementation of the first aspect, the message aggregation rule parameter includes at least one of a mixed rule parameter, an extraction rule parameter, and a convergence rule parameter, the mixed rule parameter is used to indicate to perform message extraction processing and the message aggregation processing on the first message on which the signature verification processing is performed, the extraction rule parameter is used to indicate a manner of performing the message extraction processing on the first message on which the signature verification processing is performed, and the convergence rule parameter is used to indicate a manner of performing the message aggregation processing on the first message on which the signature verification processing is performed.

With reference to the second possible implementation of the first aspect, in a third possible implementation of the first aspect, the extraction rule parameter includes a rule parameter indicating extraction to be performed based on a time period or a rule parameter indicating extraction to be performed based on a quantity of messages, and the convergence rule parameter includes a rule parameter indicating convergence to be performed based on a time period or a rule parameter indicating convergence to be performed based on a quantity of messages.

With reference to any one of the first aspect or the foregoing possible implementations of the first aspect, in a fourth possible implementation of the first aspect, performing, based on the message aggregation rule parameter, message aggregation processing on a first message on which the signature verification is performed includes connecting, in an end-to-end manner, at least two first messages on which the signature verification is performed, to form the second message, or obtaining message bodies in the at least two first messages on which the signature verification is performed, and writing, in an end-to-end manner, the message bodies into a same first message, to obtain the second message, where the at least two first messages are from same user equipment, the second message includes a message header and a signature part, and the message header includes a certificate of the user equipment.

With reference to any one of the first aspect or the foregoing possible implementations of the first aspect, in a fifth possible implementation of the first aspect, the reporting control rule parameter includes at least one of a period of reporting a message, a quantity of reported messages, or a size of a reported message.

With reference to any one of the first aspect or the foregoing possible implementations of the first aspect, in a sixth possible implementation of the first aspect, the control rule parameter further includes rule parameter information of a message type, the rule parameter information of the message type is used to identify a rule set corresponding to a type of the first message, and the rule set includes the signature verification rule parameter, the message aggregation rule parameter and the reporting control rule parameter.

With reference to the sixth possible implementation of the first aspect, in a seventh possible implementation of the first aspect, the rule parameter information of the message type includes a configuration number or a configuration scheduling policy.

With reference to any one of the first aspect or the foregoing possible implementations of the first aspect, in an eighth possible implementation of the first aspect, the first message is at least one of a periodic reported message or an event-triggered reported message. Optionally, the periodic reported message may be a cooperative awareness message (CAM). The event-triggered reported message may be a decentralized environmental notification message (DENM).

With reference to any one of the first aspect or the foregoing possible implementations of the first aspect, in a ninth possible implementation of the first aspect, the method further includes configuring or updating the control rule parameter.

With reference to the ninth possible implementation of the first aspect, in a tenth possible implementation of the first aspect, the method further includes sending a third message, where the third message includes the control rule parameter, and the third message is used to request a resource for configuring the control rule parameter or used to request a resource for updating the control rule parameter.

With reference to the ninth possible implementation of the first aspect, in an eleventh possible implementation of the first aspect, the configuring or updating the control rule parameter includes receiving a fourth message, where the fourth message includes the control rule parameter, and configuring or updating the control rule parameter based on the fourth message.

According to a second aspect, a communication method is provided. The method includes receiving, by a server, a second message, where the second message includes a message header, a data body, and a signature part, and the message header includes a certificate of an in-vehicle apparatus, and performing, by the server, signature verification processing on the second message to obtain the data body.

According to the communication method provided in this embodiment of this application, a problem that the signature verification cannot be performed on the message in time due to insufficient performance of an RSU is resolved, network load between a communications apparatus and the server can be reduced, and further performance load of the server can be reduced.

With reference to the second aspect, in a first possible implementation of the second aspect, the method further includes receiving, by the server, a third message, where the third message comprises a control rule parameter, the third message is used to request, from the server, a resource for configuring the control rule parameter or used to request a resource for updating the control rule parameter, and the control rule parameter is used to identify a rule set of rule parameters for processing a to-be-processed message, and sending, by the server, a response message, where the response message is used to identify that allocation of the requested resource for configuring the control rule parameter is completed, or the response message is used to identify that allocation of the requested resource for updating the control rule parameter is completed.

With reference to the second aspect, in a second possible implementation of the second aspect, the method further includes sending, by the server, a fourth message, where the fourth message includes a control rule parameter, and the control rule parameter is used to identify a rule set of rule parameters for processing a to-be-processed message.

According to a third aspect, an embodiment of this application provides a communications apparatus. The communications apparatus has a function of implementing behavior of the communications apparatus in the method in the first aspect. The function may be implemented by hardware, or may be implemented by hardware by executing corresponding software. The hardware or the software includes one or more modules corresponding to the foregoing function.

According to a fourth aspect, an embodiment of this application provides a server. The server has a function of implementing behavior of the server in the method in the second aspect. The function may be implemented by hardware, or may be implemented by hardware by executing corresponding software. The hardware or the software includes one or more modules corresponding to the foregoing function.

According to a fifth aspect, a communications apparatus is provided. The communications apparatus includes a receiver, a transmitter, a processor, and a memory. The receiver and the transmitter are configured to receive and send data. The memory is configured to store a program. The processor is configured to execute the program stored in the memory, to control the device to perform the method in any one of the first aspect or the possible implementations of the first aspect.

According to a sixth aspect, a server is provided. The server includes a receiver, a transmitter, a processor, and a memory. The receiver and the transmitter are configured to receive and send data. The memory is configured to store a program. The processor is configured to execute the program stored in the memory, to control the device to perform the method in any one of the second aspect or the possible implementations of the second aspect.

According to a seventh aspect, a communications system is provided. The communications system includes the communications apparatus according to any one of the fifth aspect or the possible implementations of the fifth aspect, and the server according to any one of the sixth aspect or the possible implementations of the sixth aspect.

According to an eighth aspect, a computer storage medium is provided. The computer storage medium is configured to store a program, and when the program is executed, the method according to any one of the possible implementations of the first aspect to the possible implementations of the second aspect is implemented.

According to a ninth aspect, a computer program or a computer program product is provided. The computer program or the computer program product includes an instruction, and when the instruction is executed, the method provided in any one of the first aspect and the second aspect is implemented Based on the provided secure communication method, the communications apparatus, the server, and the system, signature verification processing and message aggregation processing are performed on a received first message by using a control rule parameter configured in the communications apparatus, and a first message is sent to the server for further processing. This effectively resolves a problem that signature verification cannot be performed on a broadcast message in time due to insufficient performance of an RSU.

DESCRIPTION OF EMBODIMENTS

An Internet of Things (IoT) is an internet where objects are interconnected. Through a communications technology, for example, a local network or an internet, a sensor, a controller, a machine, people, and a thing are connected in a new manner, to form a connection between people and things and a connection between things and things, to implement a network of informatization, remote management control and intelligentization. The IoT is an extension of the internet. The IoT includes the internet and all resources on the internet, and is compatible with all applications on the internet. However, all elements (including all devices, resources, and communications) in the IoT are personalized and privatized.

A concept of an internet of vehicles derives from the IoT. A definition of the internet of vehicles varies based on different industry backgrounds. Conventionally, the internet of vehicles is defined as a system in which an electronic label mounted on a vehicle is used to, through an identification technology, for example, a radio frequency technology, extract and effectively use, on the information network platform, attribute information, static information, and dynamic information of all vehicles. The system effectively monitors running status of the all the vehicles based on different function requirements, or provides integrated services With development of technologies and industries of the internet of vehicles, the conventional definition of the internet of vehicles cannot cover all content of the internet of vehicles. According to a definition of an internet of vehicles industry technology innovation strategic alliance, the internet of vehicles is a large system network that implements vehicle—X wireless communication and vehicle—X information exchange based on an intra-vehicle network, an inter-vehicle network, and a vehicle-mounted mobile internet, and according to an agreed communications protocol and a data interaction standard. The internet of vehicles is an integrated network that can implement intelligent traffic management and intelligent dynamic information services and intelligent vehicle control, and is a typical application of internet of things technologies in a traffic system field. "X" in vehicle—X refers to a vehicle, a communications apparatus (for example, an RSU), a device carried by a pedestrian, the internet, or the like.

V2X means vehicle-to-everything, namely, external information exchange by a vehicle. X may be a vehicle, a communications apparatus (for example, an RSU), a device carried by a pedestrian, the internet, or the like. By integrating a global positioning system navigation technology, a vehicle-to-vehicle communication technology, a wireless communication technology, and a remote sensing technology, the internet of vehicles points out a direction for development of new vehicle technologies, and implements compatibility between manual driving and automatic driving.

Figure 1:
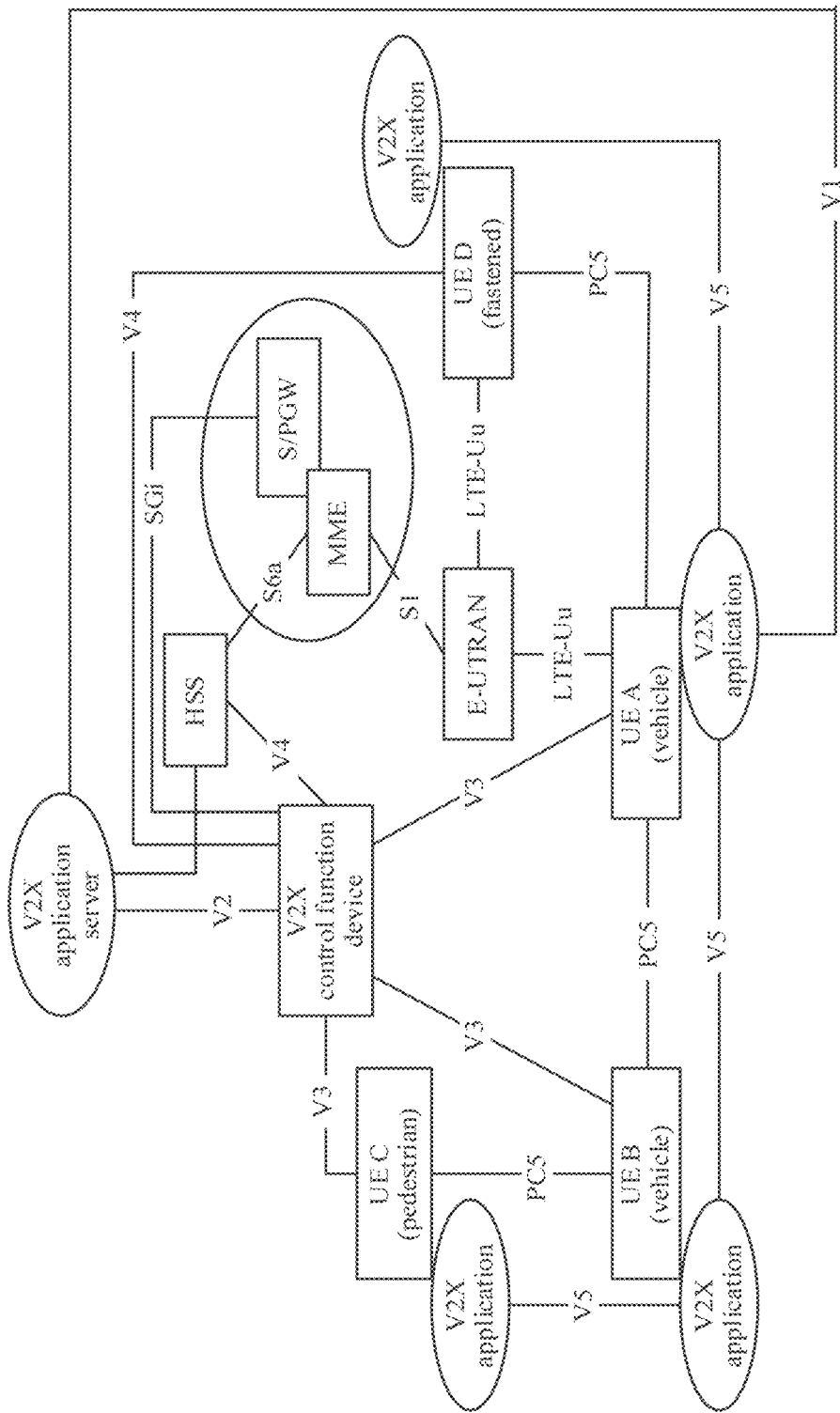
FIG. 1 is a schematic diagram of a V2X system architecture according to an embodiment of this application.

An internet of vehicles communications technology Long-Term Evolution (LTE)-vehicle (LTE-V), which supports two communication modes: PC5 and Uu, is defined in the 3rd Generation Partnership Project (3GPP). A system architecture of the LTE-V defined in the 3GPP is shown in FIG. 1. A V2X application server (AS), a V2X control function (CF) device, and a V2X application program device are network elements newly added based on the system architecture of the LTE in the 3GPP. The V2X AS is responsible for V2X service logic processing, and the V2X CF is responsible for V2X service authentication and authorization. A user equipment (UE) is connected to UE by using a PC5 interface, and the UE is connected to an Evolved Universal Mobile Telecommunications System (UMTS) Terrestrial Radio Access Network (E-UTRAN) by using a Uu interface. In a V2V application scenario, the vehicle may release a V2V message by using the PC5 interface or the Uu interface.

The user equipment in FIG. 1 may include an OBU and the communications apparatus (for example, the RSU). The OBU is configured to periodically report vehicle status information (for example, a CAM) and report an alarm message (for example, a DENM) when an event is triggered. The communications apparatus is configured to aggregate messages reported by surrounding vehicles, and broadcast an alarm message of an emergency. In this embodiment of this application, the vehicle is referred to as the user equipment.

Figure 2:
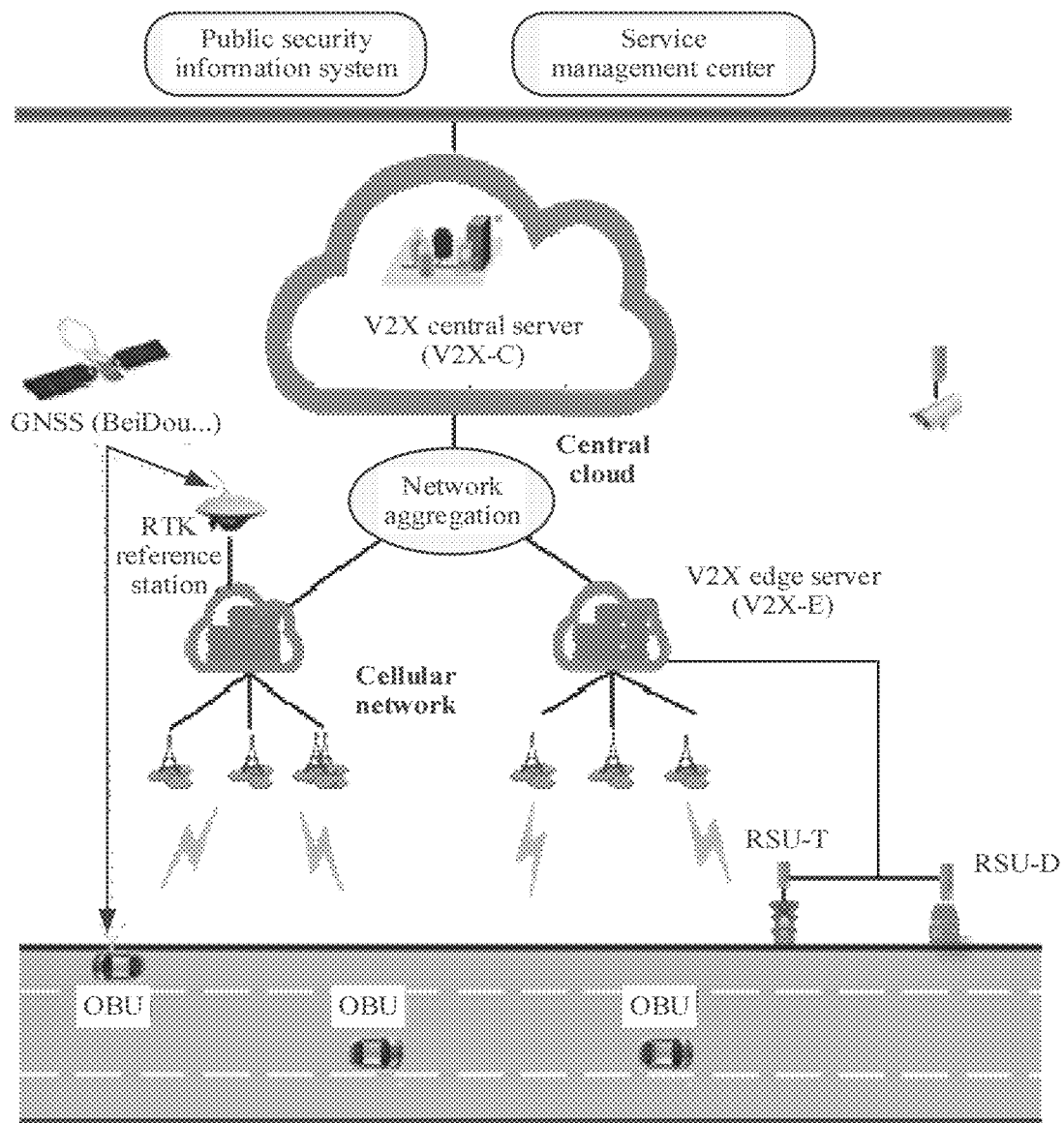
FIG. 2 is a schematic diagram of a V2X scenario according to an embodiment of this application.

Based on the system architecture in FIG. 1, an actual application scenario of the V2X is shown in FIG. 2. FIG. 2 shows an application of a public security information system and a service management system that are based on the LTE-V. A vehicle runs on a road, an OBU is installed on the vehicle, and the OBU communicates with a reference station or a V2X edge server (V2X-E) through a cellular network. In addition, vehicle information is aggregated to a V2X central server (V2X-C) through a network, so that the public security information system and the service management system can monitor and manage the vehicle information. Alternatively, the OBU communicates with the V2X-E through the RSU (including RSU-T and RSU-D), and vehicle information is aggregated to a V2X-C through a network, so that the public security information system and the service management system can monitor and manage the vehicle information. The OBU sends a message in a broadcast manner. For example, the OBU periodically sends a CAM message, or when a special event is triggered, the OBU sends a DENM message. The two types of the messages are broadcast and sent by using the PC5 interface shown in FIG. 1, and the RSU performs message aggregation, and uploads a message on which the message aggregation is performed to a V2X server for subsequent processing.

Figure 3:
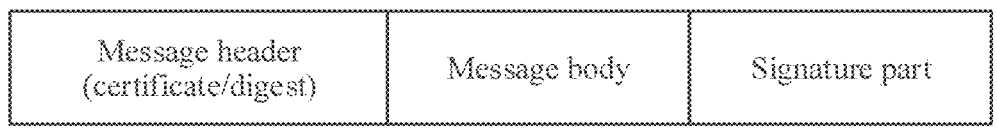
FIG. 3 is a schematic diagram of a V2V secure communication framework according to an embodiment of this application.

For information security, a message sent by the OBU is usually encrypted, and a to-be-broadcast message is protected by using a signature in a form of a certificate chain. A specific form of an encrypted broadcast message is shown in FIG. 3. The broadcast message includes a message header, a message body, and a signature part. The message header includes a certificate.

Therefore, when the RSU receives the message sent by the OBU, two-step signature verification needs to be performed to determine authenticity of the message. The RSU first verifies validity of a certificate based on a public key Kc corresponding to the certificate of a certificate authority (CA). After the verification succeeds, the RSU extracts a public key Kp of the OBU from the certificate, and then uses the public key Kp of the OBU to verify a signature carried in the message, to verify that the broadcast message is not tampered during a broadcast process. In this embodiment of this application, the signature verification may be referred to as the signature verification for short.

When there is a small quantity of OBUs, the RSU can verify the authenticity of the message in the two steps. However, on an actual road, a coverage area of the RSU is generally 250meters (m) to 500 m, and there is a large quantity of OBUs in the range. If a large quantity of OBUs periodically (for example, at a high frequency of 10 hertz (Hz)) send messages, actual processing load of the RSU is very large.

Generally, a processing capability of an RSU chip performing signature verification twice on the message is 190 messages per second. According to ETSI and 3GPP, the OBU periodically sends CAM messages at a frequency of 10 messages per second. Therefore, theoretically, the RSU can support a maximum of 20 OBUs. On an actual road, a coverage area of an RSU is usually 250 m to 500 m, and a quantity of OBUs in the coverage area of the RSU is usually far greater than 20. Therefore, a problem that the signature verification cannot be performed on the broadcast message in time due to insufficient performance of the RSU occurs.

If the RSU reports, to the V2X server, all messages broadcast by the OBU, and the V2X server processes the messages, the load of the RSU can be reduced. However, a processing capability of the V2X server is also limited. The processing capability of the V2X server is tens of thousands of times per second, and one V2X server is usually connected to a plurality of RSUs. Therefore, the RSU cannot send, without limitation and without performing any signature verification processing, a message broadcast by the OBU to the V2X server for processing.

To resolve this problem, embodiments of this application provide a communication method, a communications apparatus, a server, and a system. A control rule parameter is set in the communications apparatus, and processing, for example, signature verification processing and message aggregation processing, is performed on a received message based on the control rule parameter. In addition, a processed message is further sent to the server based on the control rule parameter, and the server completes further processing, to resolve the problem that the signature verification cannot be performed on the message in time due to insufficient performance of an RSU, to reduce network load between the communications apparatus and the server, and further to reduce performance load of the server.

In this embodiment, the communications apparatus may be the RSU, and the server is a V2X server. That the control rule parameter is set in the communications apparatus may include the following. A control rule parameter of a message broadcast by the communications apparatus by using the PC5 interface is determined through interaction between the communications apparatus and the V2X server. Then, the communications apparatus processes the corresponding message based on the control rule parameter, and sends the processed message to the V2X server for further processing. Subsequently, the communications apparatus may further update the control rule parameter based on an actual requirement.

In this embodiment of this application, the control rule parameter may also be referred to as a name such as a security control parameter or a control policy parameter. This is not limited in this embodiment of this application.

The following describes technical solutions of embodiments in this application with reference to accompanying drawings. In the following descriptions of the embodiments, an example in which the communications apparatus is an RSU is used for description. In addition, "first", "second", "third", and "fourth" are merely intended to distinguish between things, and do not limit the things themselves.

Figure 4:
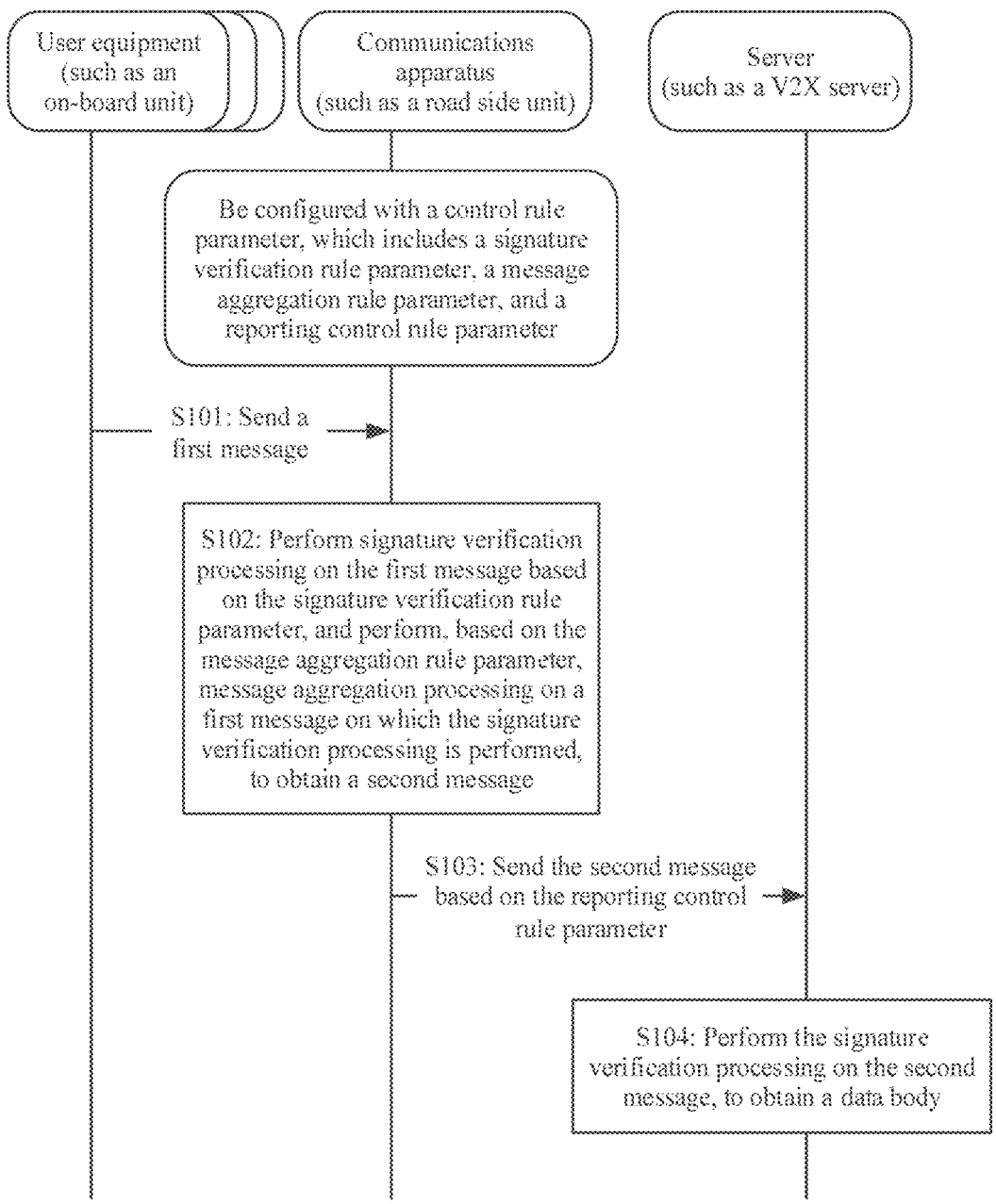
FIG. 4 is a schematic flowchart of a communication method according to an embodiment of this application.

FIG. 4 is a schematic flowchart of a communication method according to an embodiment of this application. As shown in FIG. 4, the communication method is applied to a communications apparatus (for example, an RSU). The communications apparatus is configured with a control rule parameter, and the control rule parameter includes a signature verification rule parameter, a message aggregation rule parameter, and a reporting control rule parameter. The signature verification rule parameter is used to identify to perform signature verification processing on a to-be-processed message (for example, the following first message) or not to perform signature verification processing on a to-be-processed message. The message aggregation rule parameter is used to identify to perform message aggregation processing on a to-be-processed message on which the signature verification processing is performed, for example, aggregating a plurality of to-be-processed messages on which signature verification is performed into one message. The reporting control rule parameter is used to identify a manner of sending the message to a server. For example, the message is sent to the server once every month, and the message herein refers to a message obtained after the signature verification processing and the message aggregation processing are performed on the to-be-processed message. As shown in FIG. 4, the method may include the following steps.

S101: A communications apparatus receives a first message sent by user equipment.

Optionally, the user equipment may be an OBU. In this embodiment, an example in which the communications apparatus is an RSU and the user equipment is the OBU is used for description. The RSU receives the first message sent by the OBU. Optionally, the first message may be a CAM message periodically sent by the OBU, or may be a DENM message, another message, or the like that is sent by the OBU when a special event is triggered.

S102: The communications apparatus performs signature verification processing on the first message based on a signature verification rule parameter, and performs, based on a message aggregation rule parameter, message aggregation processing on a first message on which the signature verification processing is performed.

After the OBU enters a coverage area of the RSU, the OBU periodically broadcasts the first message, in other words, the RSU continuously receives the first message sent by the OBU, for example, the CAM message periodically reported by the OBU. The CAM message includes a message header, a message body, and a signature part, the message header carries an OBU certificate or a digest of an OBU certificate. For example, the OBU continuously reports CAM messages at a frequency of 10 Hz, in other words, reports 10 CAM messages every second. In this embodiment, in the 10 CAM messages sent within 1 second (s), one CAM message carries the OBU certificate, and other CAM messages do not carry the OBU certificate, but carry the digest of the OBU certificate. In other words, in the 10 CAM messages, a message header of one CAM message carries the OBU certificate, other headers of the other nine CAM messages carry the digest of the OBU certificate.

The RSU performs the signature verification processing and the message aggregation processing on the received first message. It should be noted that before the RSU performs the S102, the RSU configures a control rule parameter. The RSU performs the signature verification processing on the first message based on the signature verification rule parameter in the control rule parameter, and performs the message aggregation processing on the first message based on the message aggregation rule parameter in the control rule parameter. In this embodiment, the RSU may alternatively perform the message aggregation processing on the first message on which the signature verification processing is performed.

Optionally, in this embodiment of this application, the signature verification rule parameter may include a first rule parameter and a second rule parameter, and the first rule parameter is used to indicate to perform the signature verification processing on the first message. The second rule parameter is used to indicate not to perform the signature verification processing on the first message. For example, the first rule parameter is used to indicate to perform the signature verification processing on the periodically sent CAM message. The second rule parameter is used to indicate not to perform the signature verification processing on the DENM message sent based on event triggering.

The mixed rule parameter is used to indicate to perform message extraction processing and the message aggregation processing on the first message. The extraction rule parameter is used to indicate a manner of performing the message extraction processing on the first message. The convergence rule parameter is used to indicate a manner of performing the message convergence processing on the first message.

For example, if the extraction rule parameter is a rule parameter indicating extraction to be performed based on a time period, the first message is extracted based on a specified time period. For example, if the RSU receives, per second, one first message sent by the OBU, and the rule parameter indicating extraction to be performed based on a time period indicates to extract one first message every 10 s, the RSU extracts the first message based on the rule parameter indicating extraction to be performed based on a time period.

Optionally, in this embodiment, the extraction rule parameter may alternatively be a rule parameter indicating extraction to be performed based on a quantity of messages. For example, one first message is extracted from every 20 first messages.

In a process of extracting the first message based on the extraction rule parameter, a $1^{st}$ first message or another first message within a specified quantity of messages or within the specified time period may be randomly extracted. If the $1^{st}$ first message is extracted, the $1^{st}$ first message is a message carrying the certificate, and is a completed message. If the extracted message is a first message that carries the digest, the digest in the first message may be replaced with the certificate, so that a V2X server subsequently performs the signature verification processing on the message.

The convergence rule parameter may also be a rule parameter, for example, a rule parameter indicating convergence to be performed based on a time period or a rule parameter indicating convergence to be performed based on a quantity of messages.

Figure 5:
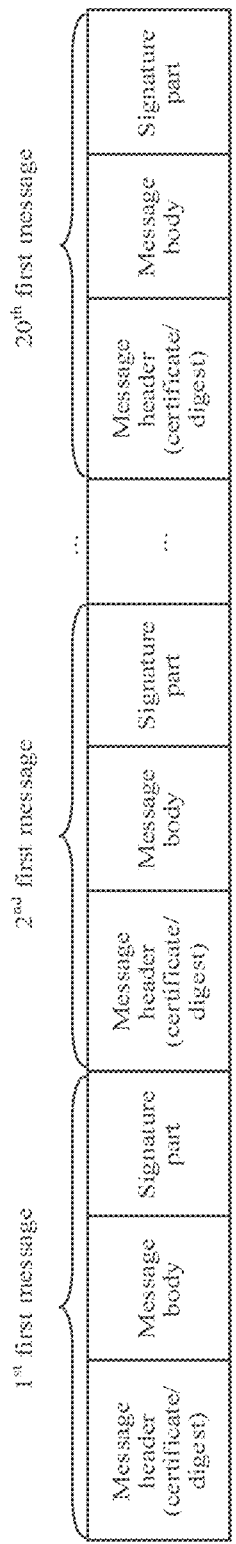
FIG. 5 is a schematic diagram of a message format according to an embodiment of this application.

For example, the first messages are aggregated and converged based on the rule parameter indicating convergence to be performed based on a quantity of messages. Optionally, in an embodiment, the RSU connects, in an end-to-end manner, at least two first messages on which the signature verification processing is performed, to form a second message. The second message is a new message obtained after the aggregation and convergence are performed on the first message on which the signature verification is performed. For example, the 20 first messages are aggregated and converged, and the 20 first messages are connected in the end-to-end manner to form the second message, as shown in FIG. 5. In this embodiment, the 20 messages to be aggregated and converged may be from a same OBU, or may be from different OBUs.

It should be noted that, if the signature verification rule parameter is the second rule parameter, when messages are aggregated and converged, the RSU connects the received at least two first messages in the end-to-end manner, to form the second message.

Figures 6, 7:
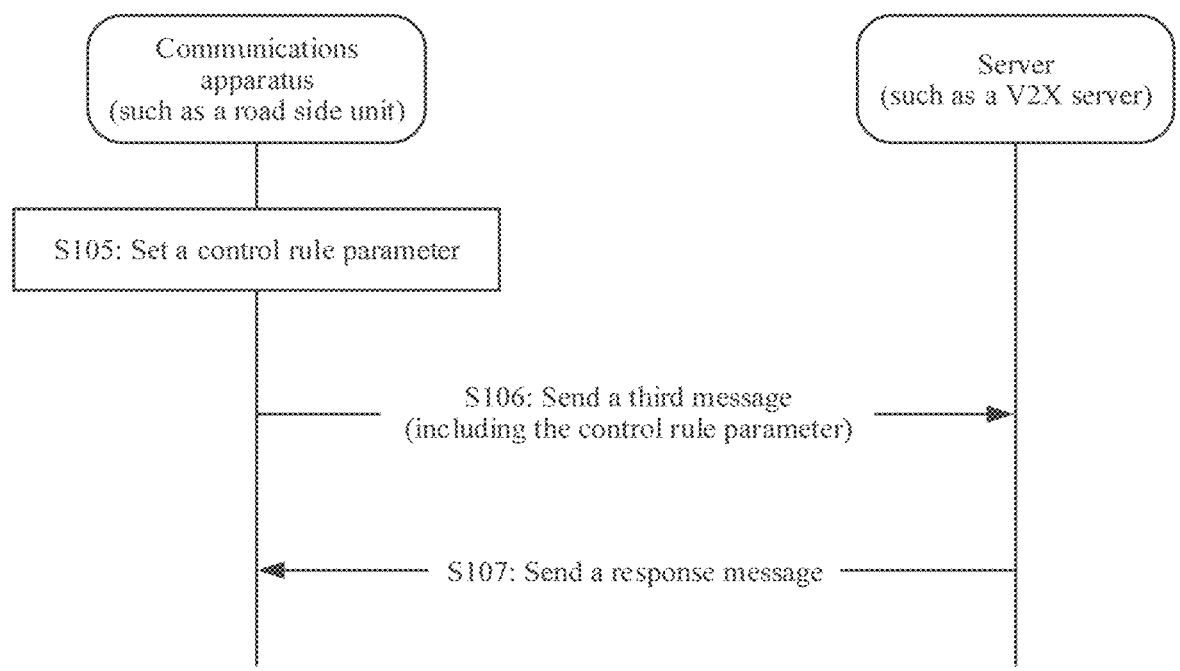
FIG. 6 is a schematic diagram of another message format according to an embodiment of this application.
FIG. 7 is a schematic flowchart of a control rule parameter configuring method according to an embodiment of this application.

Optionally, in another embodiment, the RSU obtains at least two first messages sent by a same OBU, obtains message bodies in the at least two first messages on which the signature verification is performed, and writes, in an end-to-end manner, the obtained message bodies into a same first message, to obtain a second message. The second message includes a message header and a signature part, and the message header includes an OBU certificate. For example, the RSU connects, in the end-to-end manner, message bodies in 20 messages that are from a same OBU and on which the signature verification is performed, and puts the message bodies into a same first message that includes the OBU certificate and the signature part, to obtain the second message. As shown in FIG. 6, the second message includes one OBU certificate, 20 message bodies, and one signature part.

Optionally, in an embodiment, when message bodies of 20 messages sent by a same OBU are connected in an end-to-end manner, to distinguish between different message bodies, a separator, for example, 0XFF, may be added between two adjacent message bodies.

It should be noted that, if the signature verification rule parameter is the second rule parameter, when messages are aggregated and converged, the RSU obtains message bodies in at least two first messages, and writes, in an end-to-end manner, the message bodies into a same first message, to obtain a second message. The second message includes a message header and a signature part.

In an embodiment, the message aggregation rule parameter may include a mixed rule parameter. The RSU determines, based on the mixed rule parameter, to perform the message extraction processing and the message aggregation processing on the first message on which the signature verification processing is performed. In an embodiment, the RSU may perform processing according to a default message extraction rule and a message aggregation rule.

In an embodiment, the message aggregation parameter may include the extraction rule parameter. The RSU performs, based on the extraction rule parameter, the message extraction processing on the first message on which the signature verification processing is performed. In this embodiment, the RSU may perform the message aggregation processing according to a default message aggregation rule, or may directly send the extracted first message to the V2X server for next processing without performing the message aggregation processing.

In an embodiment, the message aggregation parameter may include a convergence rule parameter. The RSU performs, based on the convergence rule parameter, the message aggregation processing on the first message on which the signature verification processing is performed, and sends, to the V2X server, a message on which the message aggregation processing is performed, so that the V2X server completes further processing.

In another embodiment, the message aggregation rule parameter may include the mixed rule parameter, the extraction rule parameter, and the convergence rule parameter. The RSU determines, based on the mixed rule parameter, to perform the message extraction processing and the message aggregation processing on the first message on which the signature verification processing is performed, performs, based on the extraction rule parameter, the message extraction on the first message on which the signature verification processing is performed, and performs, based on the convergence rule parameter, the message aggregation processing on the first message on which the signature verification processing is performed. For example, the extraction rule parameter is to extract one first message every 10 s, and the convergence rule parameter is to aggregate 20 first messages once. In this case, when the RSU determines, based on the mixed rule parameter, to perform the message extraction processing and the message aggregation processing on the first message on which the signature verification processing is performed, the RSU extracts the first message according to an extraction rule of extracting one first message every 10 s, and aggregates the first message according to a convergence rule of aggregating 20 first messages once.

It should be noted that, in this embodiment, if the signature verification rule parameter is the second rule parameter, the RSU directly performs the message aggregation on the received first messages when messages are aggregated and converged.

After performing the signature verification processing and the message aggregation processing on the first message based on the signature verification rule parameter and the message aggregation rule parameter, the RSU performs S103.

S103: The communications apparatus sends the second message based on the message reporting control rule parameter.

The second message is a message obtained after the signature verification processing and the message aggregation processing are performed on the first message.

The reporting control rule parameter may include at least one of parameters such as a period of reporting a message, a quantity of reported messages, or a size of a reported message.

The period of reporting the message indicates that, for example, a message is reported once a day or once a week. The RSU sends the second message to the V2X server based on the period of reporting the message, so that the V2X server subsequently further processes the second message.

the quantity of reported messages indicates that, for example, the RSU reports messages each time the RSU caches 100 messages, or reports a message each time it processes a message, in other words, reports a message in time. The RSU sends the second message to the V2X server based on the quantity of reported messages, so that the V2X server processes the second message.

The size of the reported message indicates that, for example, when a size of the second message reaches 1 megabyte (MB), the second message is reported once. The RSU sends the second message to the V2X server based on the size of the reported message, so that the V2X server performs subsequent processing on the second message.

Optionally, in this embodiment, the control rule parameter may further include rule parameter information of a message type, used to identify a rule set corresponding to a type of the first message. The rule set includes the signature verification rule parameter, the message aggregation rule parameter, and the reporting control rule parameter.

The message type may include a type of a periodically sent message (for example, the CAM message) or a type of the event-triggered message (for example, the DENM message). Rule parameter information of the message type may be a rule set for processing the CAM message, or may be a rule set for processing the DENM message. Optionally, in an embodiment, the message type may not be distinguished, and the rule parameter information of the message type is a rule set of same manners of processing which is performed on messages whose message types may not be distinguished. For example, the CAM message and the DENM message each are processed by using the same signature verification rule parameter, the same message aggregation rule parameter, and the same reporting control rule parameter.

Optionally, in an embodiment, the rule parameter information of the message type is a configuration number, and the configuration number is used to identify a rule set. For example, the configuration number is 0, and is used to identify a rule set for processing the CAM message, the configuration number is 1, and is used to identify a rule set for processing the DENM message, and the configuration number is 2, and is used to identify a rule set for processing the message whose message type is not distinguished.

Optionally, in an embodiment, the rule parameter information of the message type may further be a configured scheduling policy parameter, and the configured scheduling policy parameter is used to specify whether to process the first message, and whether to process the first message when the RSU is idle or busy.

For example, in an embodiment, the configured scheduling policy parameter is used to identify a type of messages (for example, periodic reported messages, such as, CAM messages) on which the signature verification processing and the message aggregation processing are performed, and a type of messages (for example, event-triggered reported messages, such as, DENM messages) on which the signature verification processing and the message aggregation processing are not performed. The RSU further forwards the message to the V2X server for processing.

Optionally, in another embodiment, the configured scheduling policy parameter may further be a policy parameter that is used to identify a policy, for example, processing each CAM message or DENM message when the CAM message or the DENM message is idle.

It should be noted that, in this embodiment, there is a priority relationship between parameters in the control rule parameter, for example, a priority of a configuration number or a configuration scheduling policy is higher than that of the signature verification rule parameter, the message aggregation rule parameter, and the reporting control rule parameter.

S104: The server performs the signature verification processing on the second message, to obtain a data body.

In this embodiment, the server may be the V2X server. After verifying the certificate and the signature for the received second message, the V2X server extracts and stores the data body of the second message.

Optionally, in another embodiment, after receiving the second message, the V2X server may directly store the second message, and does not perform the signature verification processing on the second message.

According to the communication method provided in this embodiment of this application, a problem that the signature verification cannot be performed on the message in time due to insufficient performance of an RSU is resolved, network load between the communications apparatus and the server can be reduced, and further performance load of the server can be reduced.

Optionally, in this embodiment, the first message may be a V2X message, including the periodic reported message, for example, the CAM, or the event-triggered reported message, for example, the DENM.

Optionally, as shown in FIG. 7, before performing the signature verification processing and the message aggregation processing on the first message based on the signature verification rule parameter and the message aggregation rule parameter, the method further includes the following.

S105: The control rule parameter is configured on the communications apparatus.

In this embodiment, an example in which the communications apparatus is the RSU and the server is the V2X server is used for description. The control rule parameter is locally configured in the RSU. The control rule parameter may include other control rule parameters such as the signature verification rule parameter, the message aggregation rule parameter, and the reporting control rule parameter.

The signature verification rule parameter may be referred to as an RSU signature verification rule parameter or another name, and may include the first rule parameter and the second rule parameter. The first rule parameter is used to indicate to perform the signature verification processing on the to-be-processed message. The second rule parameter is used to indicate not to perform the signature verification processing on the to-be-processed message. For example, the first rule parameter is used to indicate to perform the signature verification processing on the CAM message. The second rule parameter is used to indicate not to perform the signature verification processing on the DENM message. The signature verification refers to certificate verification and signature verification.

The message aggregation rule parameter may also be referred to as a message aggregation policy parameter, and may include at least one of parameters such as the mixed rule parameter, the extraction rule parameter, and the convergence rule parameter. The mixed rule parameter is used to indicate to perform the message extraction processing and the message aggregation processing on the to-be-processed message. The extraction rule parameter is used to indicate a manner of performing the message extraction processing on the to-be-processed message. The convergence rule parameter is used to indicate a manner of performing aggregation processing on the to-be-processed message. The to-be-processed message herein may be the first message on which the signature verification processing is performed in the S102 in FIG. 4, or may be the first message on which the signature verification processing is not performed.

The reporting control rule parameter may include at least one of parameters such as a period of reporting a message, a quantity of reported messages, or a size of a reported message.

Optionally, in this embodiment, the control rule parameter may further include rule parameter information of a message type, used to identify a rule set corresponding to a type of the first message. The rule set includes the signature verification rule parameter, the message aggregation rule parameter, and the reporting control rule parameter.

In an embodiment, the rule parameter information of the message type may be a configuration number, and the configuration number is used to identify a rule set. For example, the configuration number is 0, and is used to identify a rule set for processing the CAM message, the configuration number is 1, and is used to identify a rule set for processing the DENM message, and the configuration number is 2, and is used to identify a rule set for processing the message whose message type is not distinguished.

Optionally, in an embodiment, the rule parameter information of the message type may further be a configured scheduling policy parameter, and the configured scheduling policy parameter is used to specify whether to process the first message, and whether to process the first message when the RSU is idle or busy.

A specific use of the foregoing control rule parameter is the same as a use of each control rule parameter in the steps S102, S103, and S104 in FIG. 4. For brevity, details are not described herein again.

S106: The communications apparatus sends a third message, where the third message includes the control rule parameter.

The RSU sends the third message to the V2X server. The third message is used to request the V2X server to configure a resource of the control rule parameter. The control rule parameter is a rule parameter identifying processing of the first message.

In an embodiment, the third message may be referred to as a configuration request message.

S107: The server sends a response message.

After receiving the third message sent by the RSU, the V2X server allocates a corresponding resource based on the third message, and then sends the response message to the RSU, to notify the RSU of information such as resource allocation completion.

Figure 8:
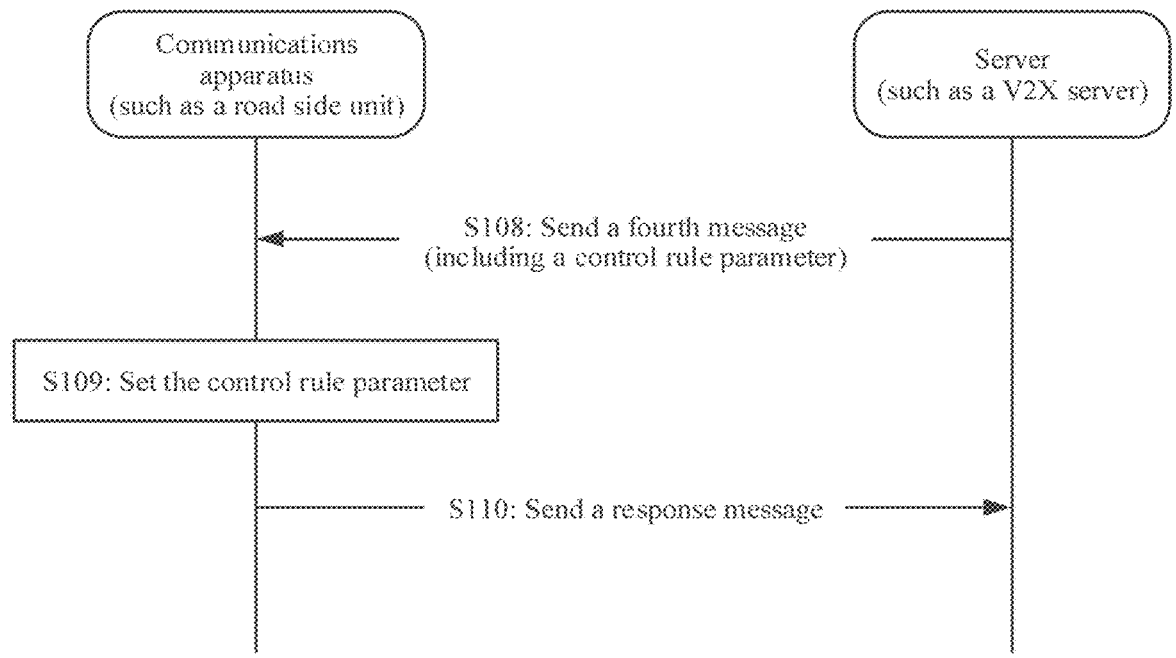
FIG. 8 is a schematic flowchart of another control rule parameter configuring method according to an embodiment of this application.

Optionally, in this embodiment, the control rule parameter may also be configured for the RSU in another manner, as shown in FIG. 8. The method includes the following steps.

S108: The server sends a fourth message.

The V2X server sends the fourth message to a registered RSU, where the fourth message includes the control rule parameter. In this embodiment, the fourth message may be referred to as the configuration request message.

S109: The communications apparatus completes local configuration of the control rule parameter based on the fourth message.

The control rule parameter is the same as the control rule parameter in FIG. 7, and a usage of each included rule parameter is the same as a usage of each rule parameter included in the control rule parameter in FIG. 4. For brevity, details are not described herein again.

S110: The communications apparatus sends a response message.

After completing configuration of the control rule parameter, the RSU sends the response message to the V2X server, to notify the V2X server of a message such as a configuration completion message.

Optionally, in this embodiment, after the RSU completes configuration of the control rule policy, the RSU may further update the control rule parameter based on an actual requirement. A manner of updating the control rule parameter is shown in FIG. 9 and FIG. 10.

Figure 9:
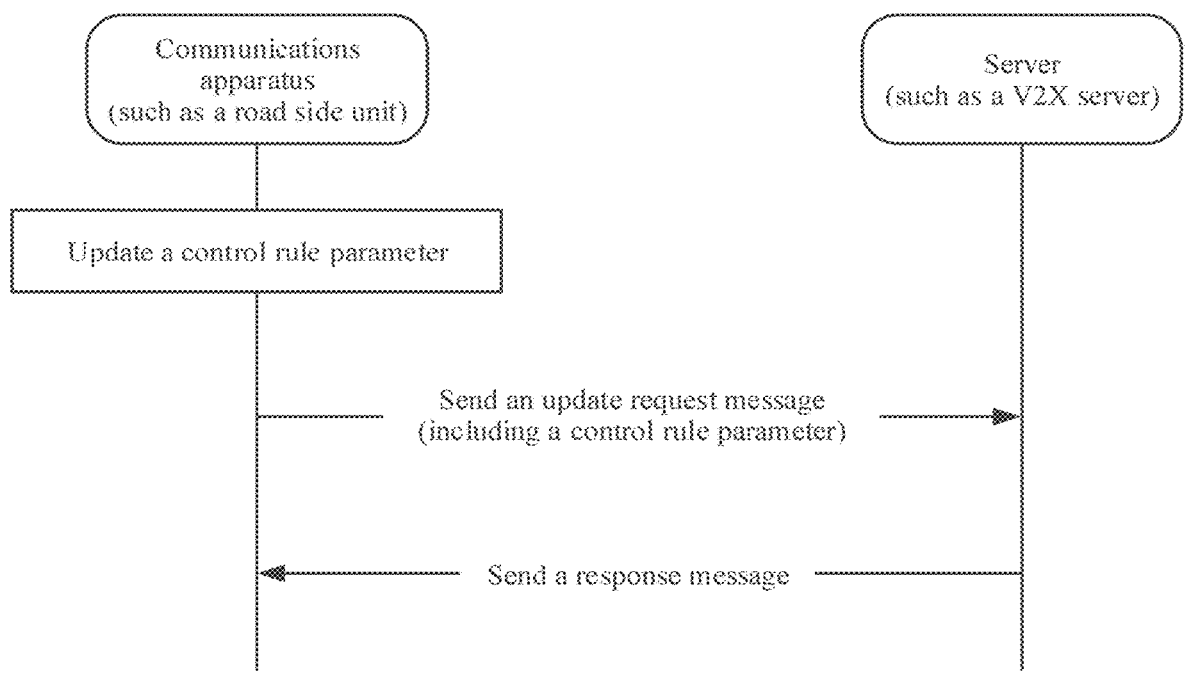
FIG. 9 is a schematic flowchart of a control rule parameter updating method according to an embodiment of this application.

FIG. 9 is a schematic flowchart of a control rule parameter updating method according to an embodiment of this application. FIG. 10 is a schematic flowchart of another control rule parameter updating method according to an embodiment of this application.

Figure 10:
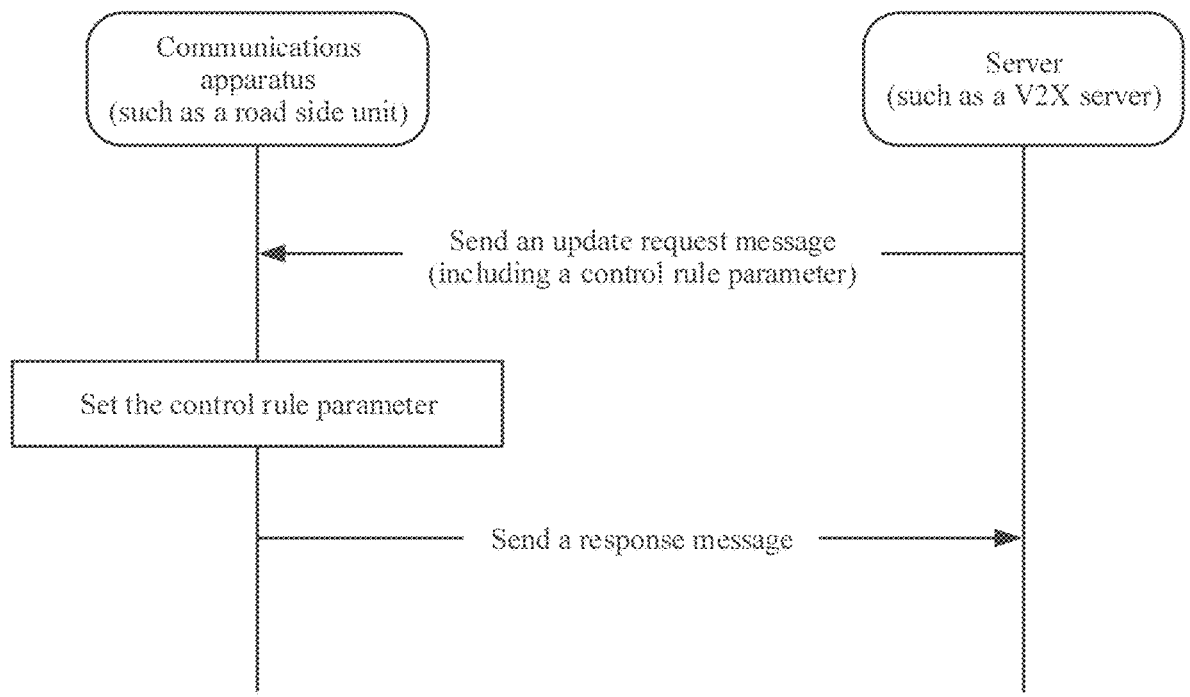
FIG. 10 is a schematic flowchart of another control rule parameter updating method according to an embodiment of this application.

The control rule parameter updating method in FIG. 9 and FIG. 10 is similar to the control rule parameter configuring method in FIG. 7 and FIG. 8. In FIG. 9 and FIG. 10, an example in which the communications apparatus is the RSU and the server is the V2X server is used for description.

In FIG. 9, the RSU locally updates a control rule parameter, and sends an update request message to the V2X server, where the update request message includes the control rule parameter, to request the V2X server to allocate a corresponding resource for updating the control rule parameter. After completing resource allocation, the V2X server sends a response message to the RSU, to indicate the RSU that the resource allocation is completed.

In FIG. 10, the V2X server remotely controls the RSU to update a control rule parameter. First, the V2X server sends an update request message to a registered RSU, where the update request message includes the control rule parameter, to request the RSU to update the control rule parameter. The RSU receives the update request message sent by the V2X server, and updates the control rule parameter based on the update request message. After the update is completed, the RSU sends a response message to the V2X server, to indicate the V2X server that the update of the control rule parameter is completed.

It should be noted that the communication method in FIG. 4 may be performed after the control rule parameter is configured in FIG. 7 and FIG. 8, or may be performed after the update of the control rule parameter is completed in FIG. 9 and FIG. 10.

FIG. 4 to FIG. 10 describe configuration, update, and usage of the control rule parameter. The following describes, with reference to FIG. 11 to FIG. 14, a communications apparatus, a server, and a system that are provided in the embodiments of this application.

Figure 11:
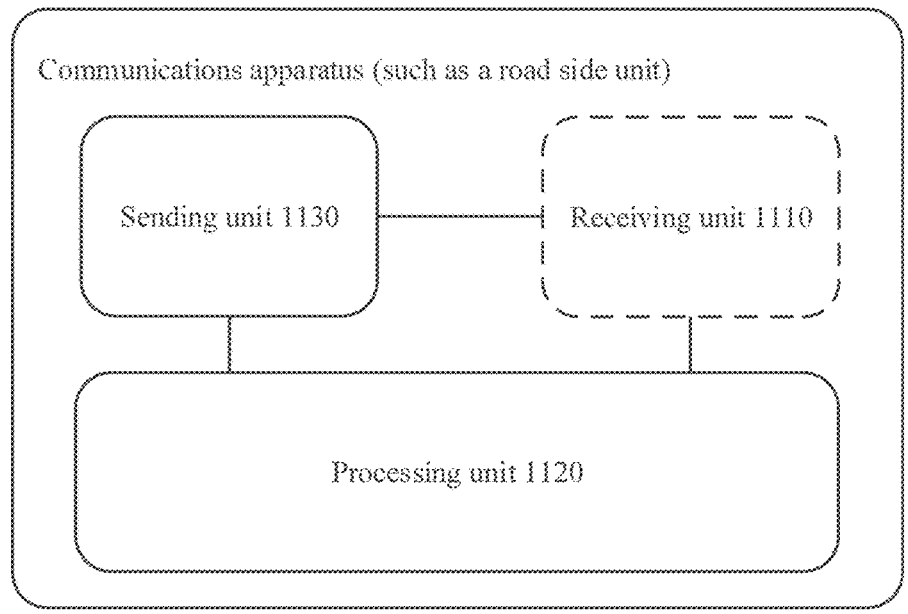
FIG. 11 is a schematic structural diagram of a communications apparatus according to an embodiment of this application.

FIG. 11 is a schematic structural diagram of a communications apparatus. The communications apparatus may be an RSU. The communications apparatus is configured with a control rule parameter. The control rule parameter includes a signature verification rule parameter, a message aggregation rule parameter, and a reporting control rule parameter. As shown in FIG. 11, the communications apparatus includes a receiving unit 1110, a processing unit 1120, and a sending unit 1130.

The receiving unit 1110 is configured to receive a first message sent by user equipment.

The processing unit 1120 is configured to perform signature verification processing on the first message based on the signature verification rule parameter, and perform, based on the message aggregation rule parameter, message aggregation processing on a first message on which the signature verification processing is performed.

The sending unit 1130 is configured to send a second message to the server based on the message reporting control rule parameter, where the second message is a message obtained after the signature verification processing and the message aggregation processing are performed on the first message.

Optionally, in an embodiment, the signature verification rule parameter includes a first rule parameter or a second rule parameter. The first rule parameter is used to indicate to perform the signature verification processing on the first message. The second rule parameter is used to indicate not to perform the signature verification processing on the first message.

Optionally, in an embodiment, the message aggregation rule parameter includes at least one of a mixed rule parameter, an extraction rule parameter, and a convergence rule parameter, the mixed rule parameter is used to indicate to perform message extraction processing and the message aggregation processing on the first message on which the signature verification processing is performed, the extraction rule parameter is used to indicate a manner of performing the message extraction processing on the first message on which the signature verification processing is performed, and the convergence rule parameter is used to indicate a manner of performing the message aggregation processing on the first message on which the signature verification processing is performed.

Optionally, in an embodiment, the extraction rule parameter includes a rule parameter indicating extraction to be performed based on a time period, or a rule parameter indicating extraction to be performed based on a quantity of messages. The convergence rule parameter includes a rule parameter indicating convergence to be performed based on a time period or a rule parameter indicating convergence to be performed based on a quantity of messages.

Optionally, in an embodiment, that the processing unit 1120 performs the message aggregation processing on the first message based on the message aggregation rule parameter includes that the processing unit 1120 connects, in an end-to-end manner, at least two first messages on which the signature verification is performed, to form the second message, or that the processing unit 1120 obtains message bodies in the at least two first messages on which the signature verification is performed, and writes, in an end-to-end manner, the message bodies into a same first message, to obtain the second message, where the at least two first messages are from same user equipment, the second message includes a message header and a signature part, and the message header includes a certificate of the user equipment.

Optionally, in an embodiment, the reporting control rule parameter includes at least one of a period of reporting a message, a quantity of reported messages, or a size of a reported message.

Optionally, in an embodiment, the control rule parameter further includes rule parameter information of a message type, the rule parameter information of the message type is used to identify a rule set corresponding to a type of the first message, and the rule set includes the signature verification rule parameter, the message aggregation rule parameter, and the reporting control rule parameter.

Optionally, in an embodiment, the rule parameter information of the message type includes a configuration number or a configuration scheduling policy.

Optionally, in an embodiment, the first message is at least one of a periodic reported message or an event-triggered reported message. Optionally, the periodic reported message may be a CAM. The event-triggered reported message may be a DENM.

Optionally, in an embodiment, the processing unit 1120 is further configured to configure or update the control rule parameter.

Optionally, in an embodiment, the sending unit 1130 is further configured to send a third message, where the third message includes the control rule parameter, and the third message is used to request a resource for configuring the control rule parameter or used to request a resource for updating the control rule parameter.

Optionally, in an embodiment, that the processing unit 1120 configures or updates the control rule parameter includes that the receiving unit 1110 receives a fourth message, where the fourth message includes a control rule parameter, and that the processing unit 1120 configures or updates the control rule parameter based on the fourth message.

In an embodiment, the receiving unit 1110 and the sending unit 1130 may be a device, for example, a transceiver unit.

Functions of functional units in the communications apparatus may be implemented by using the steps performed by the communications apparatus (for example, the RSU) in the embodiments shown in FIG. 4 to FIG. 10. Therefore, a specific working process of the communications apparatus provided in this embodiment of the present disclosure is not described herein again.

Figure 12:
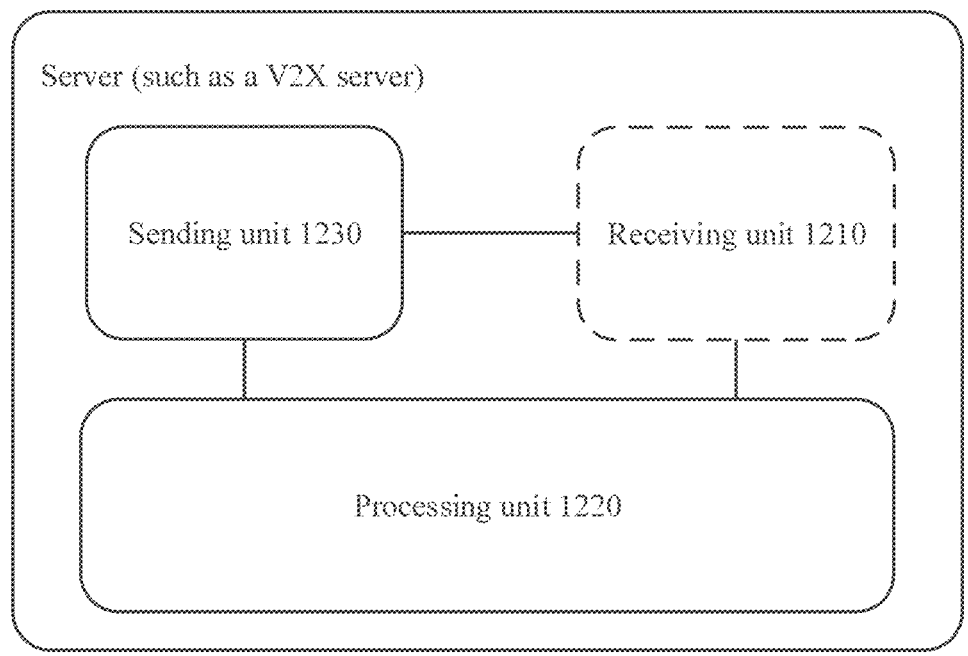
FIG. 12 is a schematic structural diagram of a server according to an embodiment of this application.

FIG. 12 is a schematic structural diagram of a server. The server may be a V2X server. As shown in FIG. 12, the server includes a receiving unit 1210 and a processing unit 1220.

The receiving unit 1210 is configured to receive a second message, where the second message includes a message header, a data body, and a signature part, and the message header includes a certificate of an in-vehicle apparatus.

The processing unit 1220 is configured to perform signature verification processing on the second message, to obtain the data body.

Optionally, in an embodiment, the server further includes a sending unit 1230.

The receiving unit 1210 is further configured to receive a third message, where the third message includes a control rule parameter, the third message is used to request, from the server, a resource for configuring the control rule parameter or used to request a resource for updating the control rule parameter, and the control rule parameter is used to identify a rule set of rule parameters for processing a to-be-processed message.

The sending unit 1230 is configured to send a response message, where the response message is used to identify that allocation of the requested resource for configuring the control rule parameter is completed, or the response message is used to identify that allocation of the requested resource for updating the control rule parameter is completed.

Optionally, in an embodiment, the sending unit 1230 is further configured to send a fourth message, where the fourth message includes a control rule parameter, and the control rule parameter is used to identify a rule set of rule parameters for processing a to-be-processed message.

Functions of functional units in the server may be implemented by using the steps performed by the server (for example, the V2X server) in the embodiments shown in FIG. 4 to FIG. 10. Therefore, a specific working process of the server provided in this embodiment of the present disclosure is not described herein again.

Figure 13:
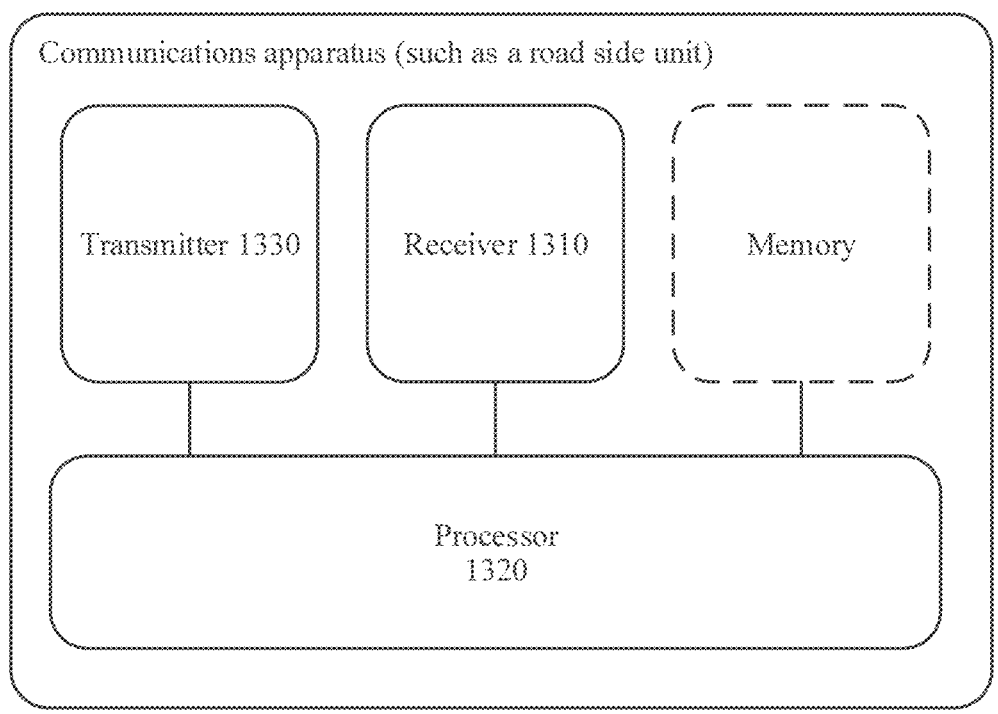
FIG. 13 is a schematic structural diagram of another communications apparatus according to an embodiment of this application.

FIG. 13 is a schematic structural diagram of a communications apparatus. The communications apparatus may be an RSU. The communications apparatus is configured with a control rule parameter. The control rule parameter includes a signature verification rule parameter, a message aggregation rule parameter, and a reporting control rule parameter. As shown in FIG. 13, the communications apparatus includes a receiver 1310, a processor 1320, and a transmitter 1330.

The receiver 1310 is configured to receive a first message sent by user equipment.

The processor 1320 is configured to perform signature verification processing on the first message based on the signature verification rule parameter, and perform, based on the message aggregation rule parameter, message aggregation processing on a first message on which the signature verification processing is performed.

The transmitter 1330 is configured to send a second message to the server based on the message reporting control rule parameter, where the second message is a message obtained after the signature verification processing and the message aggregation processing are performed on the first message.

Optionally, in an embodiment, the signature verification rule parameter includes a first rule parameter or a second rule parameter. The first rule parameter is used to indicate to perform the signature verification processing on the first message. The second rule parameter is used to indicate not to perform the signature verification processing on the first message.

Optionally, in an embodiment, the message aggregation rule parameter includes at least one of a mixed rule parameter, an extraction rule parameter, and a convergence rule parameter, the mixed rule parameter is used to indicate to perform message extraction processing and the message aggregation processing on the first message on which the signature verification processing is performed, the extraction rule parameter is used to indicate a manner of performing the message extraction processing on the first message on which the signature verification processing is performed, and the convergence rule parameter is used to indicate a manner of performing the message aggregation processing on the first message on which the signature verification processing is performed.

Optionally, in an embodiment, the extraction rule parameter includes a rule parameter indicating extraction to be performed based on a time period, or a rule parameter indicating extraction to be performed based on a quantity of messages. The convergence rule parameter includes a rule parameter indicating convergence to be performed based on a time period or a rule parameter indicating convergence to be performed based on a quantity of messages.

Optionally, in an embodiment, that the processor 1320 performs the message aggregation processing on the first message based on the message aggregation rule parameter includes that the processor 1320 connects, in an end-to-end manner, at least two first messages on which the signature verification is performed, to form the second message, or that the processor 1320 obtains message bodies in the at least two first messages on which the signature verification is performed, and writes, in an end-to-end manner, the message bodies into a same first message, to obtain the second message, where the at least two first messages are from same user equipment the second message includes a message header and a signature part, and the message header includes a certificate of the user equipment.

Optionally, in an embodiment, the reporting control rule parameter includes at least one of the following a period of reporting a message, a quantity of reported messages, or a size of a reported message.

Optionally, in an embodiment, the control rule parameter further includes rule parameter information of a message type, the rule parameter information of the message type is used to identify a rule set corresponding to a type of the first message, and the rule set includes the signature verification rule parameter, the message aggregation rule parameter, and the reporting control rule parameter.

Optionally, in an embodiment, the rule parameter information of the message type includes a configuration number or a configuration scheduling policy.

Optionally, in an embodiment, the first message is at least one of a periodic reported message or an event-triggered reported message. Optionally, the periodic reported message may be a CAM. The event-triggered reported message may be a DENM.

Optionally, in an embodiment, the processor 1320 is further configured to configure or update the control rule parameter.

Optionally, in an embodiment, the transmitter 1330 is further configured to send a third message, where the third message includes the control rule parameter, and the third message is used to request a resource for configuring the control rule parameter or used to request a resource for updating the control rule parameter.

Optionally, in an embodiment, that the processor 1320 configures or updates the control rule parameter includes that the receiver 1310 receives a fourth message, where the fourth message includes a control rule parameter, and that the processor 1320 configures or updates the control rule parameter based on the fourth message.

In an embodiment, the receiver 1310 and the transmitter 1330 may be a device, for example, a transceiver.

Optionally, in this embodiment, the apparatus further includes a memory, and the memory is configured to store an instruction and data, for example, the control rule parameter.

Functions of functional components in the communications apparatus may be implemented by using the steps performed by the communications apparatus (for example, the RSU) in the embodiments shown in FIG. 4 to FIG. 10. Therefore, a specific working process of the communications apparatus provided in this embodiment of the present disclosure is not described herein again.

Figure 14:
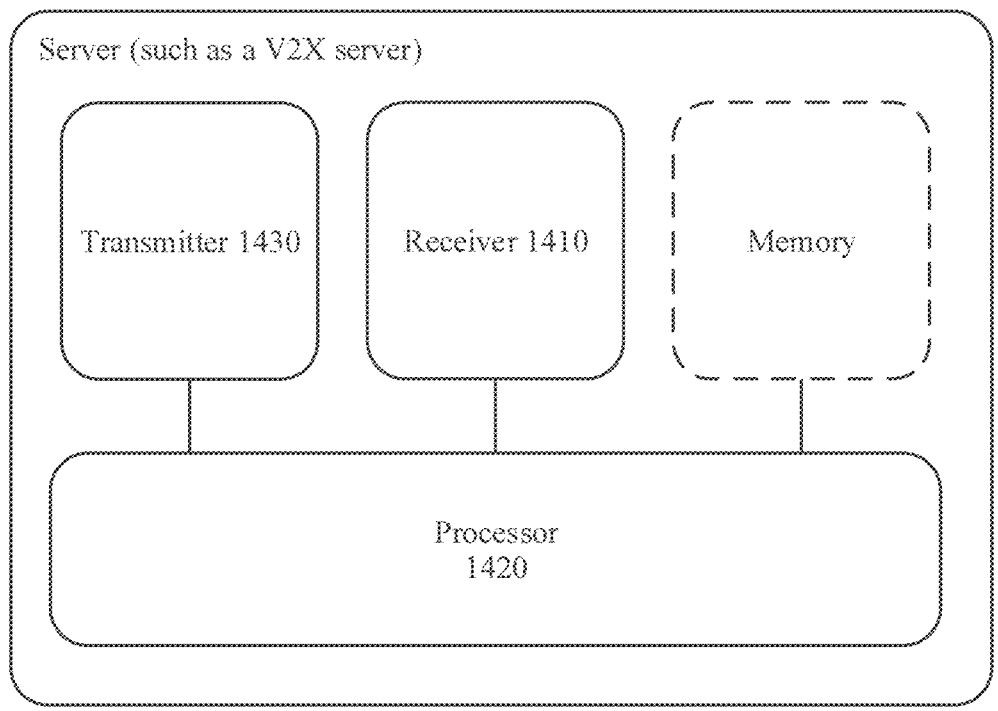
FIG. 14 is a schematic structural diagram of another server according to an embodiment of this application.

FIG. 14 is a schematic structural diagram of a server. The server may be a V2X server. As shown in FIG. 14, the server includes a receiver 1410 and a processor 1420.

The receiver 1410 is configured to receive a second message, where the second message includes a message header, a data body, and a signature part, and the message header includes a certificate of an in-vehicle apparatus.

The processor 1420 is configured to perform signature verification processing on the second message to obtain the data body.

Optionally, in an embodiment, the server further includes a transmitter 1430.

The receiver 1410 is further configured to receive a third message, where the third message includes a control rule parameter, the third message is used to request, from the server, a resource for configuring the control rule parameter or used to request a resource for updating the control rule parameter, and the control rule parameter is used to identify a rule set of rule parameters for processing a to-be-processed message.

The transmitter 1430 is configured to send a response message, where the response message is used to identify that allocation of the requested resource for configuring the control rule parameter is completed, or the response message is used to identify that allocation of the requested resource for updating the control rule parameter is completed.

Optionally, in an embodiment, the transmitter 1430 is further configured to send a fourth message, where the fourth message includes a control rule parameter, and the control rule parameter is used to identify a rule set of rule parameters for processing a to-be-processed message.

Optionally, in this embodiment, the receiver 1410 and the transmitter 1430 may be a device, for example, a transceiver.

Optionally, in this embodiment, the server further includes a memory, and the memory is configured to store an instruction and data.

Functions of functional components in the server may be implemented by using the steps performed by the server (for example, the V2X server) in the embodiments shown in FIG. 4 to FIG. 10. Therefore, a specific working process of the server provided in this embodiment of the present disclosure is not described herein again.

An embodiment of this application further provides a communications system. The communications system includes the communications apparatus shown in FIG. 13 and the server shown in FIG. 14.

An embodiment of this application provides a computer-readable storage medium. The computer-readable storage medium stores a computer program, and when the computer program is executed by a processor, the methods in FIG. 4 to FIG. 10 are implemented.

An embodiment of this application provides a computer program product including an instruction. When the instruction is run on a computer, the computer is enabled to perform the methods in FIG. 4 to FIG. 10.

It should be noted that the rule parameters mentioned in this embodiment of this application, for example, the control rule parameter, the signature verification rule parameter, the message aggregation rule parameter, and the reporting control rule parameter that are included in the control rule parameter, and the first rule parameter or the second rule parameter that is included in the signature verification rule parameter, names of parameters such as at least one parameter of the mixed rule parameter, the extraction rule parameter, and the convergence rule parameter that are included in the message aggregation rule parameter may also be referred to as other names. A specific name of the parameters is not limited in this embodiment of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present disclosure. In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of the present disclosure, but are not intended to limit the protection scope of the present disclosure. Any modification or replacement figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a communications apparatus configured with a control rule parameter, wherein the method comprises:
    receiving, from a user equipment (UE), a first message;
    performing, based on a signature verification rule parameter of the control rule parameter, signature verification processing on the first message, wherein the signature verification rule parameter comprises a first rule parameter indicating to perform the signature verification processing on the first message or a second rule parameter indicating not to perform the signature verification processing on the first message;
    performing, after performing the signature verification processing and based on a message aggregation rule parameter of the control rule parameter, a message aggregation processing on the first message to obtain a second message, wherein performing the message aggregation processing comprises:
        connecting, in an end-to-end manner, at least two first messages on which the signature verification is performed to form the second message, wherein the at least two first messages are from the UE, wherein the second message comprises a message header and a signature part, and wherein the message header comprises a certificate of the UE; or
        obtaining message bodies in the at least two first messages and writing, in the end-to-end manner, the message bodies into the second message; and
    sending, to a server and based on a reporting control rule parameter of the control rule parameter, the second message to enable the server to perform signature verification processing on the second message to obtain a data body.

2. The method of claim 1, wherein the message aggregation rule parameter comprises at least one of:
    a mixed rule parameter indicating to perform a message extraction processing and the message aggregation processing on the first message after performing the signature verification processing;
    an extraction rule parameter indicating a first manner of performing the message extraction processing on the first message after performing the signature verification processing; or
    a convergence rule parameter indicating a second manner of performing the message aggregation processing on the first message after performing the signature verification processing.

3. The method of claim 2, wherein the first rule parameter further indicates an extraction to be performed based on a time period and the second rule parameter further indicates the extraction to be performed based on a quantity of messages, and wherein the convergence rule parameter comprises a third rule parameter indicating a convergence to be performed based on the time period or a fourth rule parameter indicating the convergence to be performed based on the quantity of messages.

4. The method of claim 1, wherein the reporting control rule parameter comprises a period of reporting a third message.

5. The method of claim 1, wherein the control rule parameter further comprises rule parameter information of a message type, wherein the rule parameter information identifies a rule set corresponding to a type of the first message, and wherein the rule set comprises the signature verification rule parameter, the message aggregation rule parameter, and the reporting control rule parameter.

6. The method of claim 1, wherein the reporting control rule parameter comprises a quantity of reported messages.

7. The method of claim 1, wherein the reporting control rule parameter comprises a size of a reported message.

8. A method implemented by a server, wherein the method comprises:
    receiving a second message comprising a message header, a data body, and a signature part, wherein the message header comprises a certificate of an in-vehicle apparatus, wherein the second message is based on signature verification processing on a first message according to a signature verification rule parameter and based on message aggregation processing according to a message aggregation rule parameter, wherein the signature verification rule parameter comprises a first rule parameter indicating to perform the signature verification processing on the first message or a second rule parameter indicating not to perform the signature verification processing on the first message; and
    performing, based on the signature verification rule parameter, signature verification processing on the second message to obtain the data body.

9. The method of claim 8, further comprising:
    receiving a third message comprising a control rule parameter and requesting a first resource for configuring the control rule parameter or a second resource for updating the control rule parameter, wherein the control rule parameter identifies a rule set of rule parameters for processing a to-be-processed message; and sending a response message identifying that a first allocation of the first resource is completed or that a second allocation of the second resource is completed.

10. The method of claim 8, further comprising sending a fourth message comprising a control rule parameter identifying a rule set of rule parameters for processing a to-be-processed message.

11. A communications apparatus configured with a control rule parameter and comprising:
a receiver configured to receive, from a user equipment (UE), a first message;
a processor coupled to the receiver and configured to:
perform, based on a signature verification rule parameter of the control rule parameter, a signature verification processing on the first message, wherein the signature verification rule parameter comprises a first rule parameter indicating to perform the signature verification processing on the first message or a second rule parameter indicating not to perform the signature verification processing on the first message; and
perform, after performing the signature verification processing and based on a message aggregation rule parameter, a message aggregation processing on the first message to obtain a second message, wherein performing the message aggregation processing comprises:
connecting, in an end-to-end manner, at least two first messages on which the signature verification is performed to form the second message, wherein the at least two first messages are from the UE, wherein the second message comprises a message header and a signature part, and wherein the message header comprises a certificate of the UE; or
obtaining message bodies in the at least two first messages and writing, in the end-to-end manner, the message bodies into the second message; and
a transmitter coupled to the processor and configured to send, to a server and based on a reporting control rule parameter, the second message to enable the server to perform signature verification processing on the second message to obtain a data body.

12. The communications apparatus of claim 11, wherein the message aggregation rule parameter comprises at least one of:
a mixed rule parameter indicating to perform a message extraction processing and the message aggregation processing on the first message after performing the signature verification processing;
an extraction rule parameter indicating a first manner of performing the message extraction processing on the first message after performing the signature verification processing; or
a convergence rule parameter indicating a second manner of performing the message aggregation processing on the first message after performing the signature verification processing.

13. The communications apparatus of claim 12, wherein the first rule parameter further indicates an extraction to be performed based on a time period and the second rule parameter further indicates the extraction to be performed based on a quantity of messages, wherein the convergence rule parameter comprises a third rule parameter indicating a convergence to be performed based on the time period or a fourth rule parameter indicating the convergence to be performed based on the quantity of messages.

14. The communications apparatus of claim 11, wherein the reporting control rule parameter comprises a period of reporting a third message.

15. The communications apparatus of claim 11, wherein the control rule parameter further comprises rule parameter information of a message type, wherein the rule parameter information identifies a rule set corresponding to a type of the first message, and wherein the rule set comprises the signature verification rule parameter, the message aggregation rule parameter, and the reporting control rule parameter.

16. The communications apparatus of claim 11, wherein the first message is at least one of a cooperative awareness message (CAM) or a decentralized environmental notification message (DENM).

17. The communications apparatus of claim 11, wherein the reporting control rule parameter comprises a quantity of reported messages.

18. The communications apparatus of claim 11, wherein the reporting control rule parameter comprises a size of a reported message.

19. A server comprising:
a receiver configured to receive a second message comprising a message header, a data body, and a signature part, wherein the message header comprises a certificate of an in-vehicle apparatus wherein the second message is based on signature verification processing on a first message according to a signature verification rule parameter and based on message aggregation processing according to a message aggregation rule parameter, wherein the signature verification rule parameter comprises a first rule parameter indicating to perform the signature verification processing on the first message or a second rule parameter indicating not to perform the signature verification processing on the first message; and
a processor coupled to the receiver and configured to perform, based on the signature verification rule parameter, signature verification processing on the second message to obtain the data body.

20. The server of claim 19, further comprising a transmitter coupled to the processor, wherein the receiver is further configured to receive a third message comprising a control rule parameter and requesting a first resource for configuring the control rule parameter or a second resource for updating the control rule parameter, wherein the control rule parameter identifies a rule set of rule parameters for processing a to-be-processed message wherein the transmitter is configured to send a response message identifying that a first allocation of the first resource is completed or a second allocation of the second resource is completed.

21. The server of claim 19, further comprising a transmitter coupled to the processor and configured to send a fourth message comprising a control rule parameter identifying a rule set of rule parameters for processing a to-be-processed message.

* * * * *